US011172532B2

(12) United States Patent
Höglund et al.

(10) Patent No.: US 11,172,532 B2
(45) Date of Patent: Nov. 9, 2021

(54) NETWORK-CONTROLLED RRC RESUME VIA PAGING OR RAR

(71) Applicant: Telefonaktiebolaget LM Ericsson (publ), Stockholm (SE)

(72) Inventors: Andreas Höglund, Solna (SE); Magnus Stattin, Upplands Väsby (SE); Osman Nuri Can Yilmaz, Espoo (FI)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 38 days.

(21) Appl. No.: 16/325,512

(22) PCT Filed: Aug. 16, 2016

(86) PCT No.: PCT/SE2016/050758
§ 371 (c)(1),
(2) Date: Feb. 14, 2019

(87) PCT Pub. No.: WO2018/034599
PCT Pub. Date: Feb. 22, 2018

(65) Prior Publication Data
US 2019/0200410 A1 Jun. 27, 2019

(51) Int. Cl.
H04W 76/19 (2018.01)
H04W 76/10 (2018.01)
(Continued)

(52) U.S. Cl.
CPC ......... *H04W 76/19* (2018.02); *H04W 68/005* (2013.01); *H04W 74/008* (2013.01);
(Continued)

(58) Field of Classification Search
CPC ..... H04W 76/19; H04W 76/27; H04W 68/02; H04W 74/0833
See application file for complete search history.

(56) References Cited

U.S. PATENT DOCUMENTS

2013/0044590 A1   2/2013   Lee et al.
2016/0128007 A1*  5/2016   Keskitalo ............ H04W 56/001
                                              370/350
(Continued)

FOREIGN PATENT DOCUMENTS

WO   2011 162212 A1   12/2011
WO   2016 068776 A1   5/2016
WO   2016 091285 A1   6/2016

OTHER PUBLICATIONS

PCT International Search Report for International application No. PCT/SE2016/050758—dated Apr. 10, 2017.
(Continued)

Primary Examiner — Tejis Daya
Assistant Examiner — Hector Reyes
(74) Attorney, Agent, or Firm — Sage Patent Group

(57) ABSTRACT

In a wireless communication network that implements the RRC Resume procedure, an eNB sends to a radio network device, previously connected, given a Resume ID, a paging message or Random Access Response message including an RRC Resume directive. The RRC Resume directive comprises at least an indication whether or not the radio network device should perform an RRC Resume procedure. If RRC Resume directive indicates the radio network device should not perform an RRC Resume procedure, the radio network device performs an RRC Connection procedure. If the RRC Resume directive indicates the radio network device should perform an RRC Resume procedure, it may include additional information to optimize or otherwise assist the RRC Resume procedure. In this manner, RRC Resume signaling is avoided when the eNB knows that it will not be successful, such as if a prior RRC connection context is not available or readily retrievable, or is invalid.

18 Claims, 10 Drawing Sheets

(51) Int. Cl.
  *H04W 76/27*  (2018.01)
  *H04W 68/00*  (2009.01)
  *H04W 74/00*  (2009.01)
  *H04W 74/08*  (2009.01)
  *H04W 76/18*  (2018.01)

(52) U.S. Cl.
  CPC ........... *H04W 76/10* (2018.02); *H04W 76/27* (2018.02); *H04W 74/0833* (2013.01); *H04W 76/18* (2018.02)

(56) References Cited

U.S. PATENT DOCUMENTS

| | | | |
|---|---|---|---|
| 2017/0332419 A1* | 11/2017 | Kim | H04L 1/1861 |
| 2019/0029066 A1* | 1/2019 | Xu | H04W 76/19 |
| 2019/0037632 A1* | 1/2019 | Uchino | H04W 28/06 |
| 2019/0045570 A1* | 2/2019 | Lu | H04W 76/27 |
| 2019/0150218 A1* | 5/2019 | Futaki | H04W 80/08 |
| | | | 370/329 |

OTHER PUBLICATIONS

PCT Written Opinion of the International Searching Authority for International application No. PCT/SE2016/050758—dated Apr. 10, 2017.

3GPP TS 36.300 v. 13.4.0; Technical Specification; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)—Jun. 2016.

3GPP TS 36.331 v13.2.0; Technical Specification; 3rd Generation Partnership Project; Technical Specification Group Radio Access Network; Evolved Universal Terrestrial Radio Access (E-UTRA); Radio Resource Control (RRC); Protocol specification (Release 13)—Jun. 2016.

3GPP TSG-RAN WG2 NB-IOT Ad-Hoc Meeting; Budapest, Hungary; Source: Ericsson; Title: RRC Connection Suspend and Resume (Tdoc R2-160475)—Jan. 19-21, 2016.

* cited by examiner

NETWORK-CONTROLLED RRC RESUME VIA PAGING OR RAR

PRIORITY

This nonprovisional application is a U.S. National Stage Filing under 35 U.S.C. § 371 of International Patent Application Serial No. PCT/SE2016/050758 filed Aug. 16, 2016 and entitled "NETWORK-CONTROLLED RRC RESUME VIA PAGING OR RAR" which is hereby incorporated by reference in its entirety.

TECHNICAL FIELD

The present invention relates generally to wireless communication networks, and in particular to a system and method of the network directing a radio network device whether to attempt a RRC Resume procedure to re-establish an erstwhile RRC connection to the network.

BACKGROUND

Wireless cellular networks are approaching complete geographical coverage in many countries, and the sophistication and capabilities of the networks continues to expand. Although originally designed for telephony, there is increasing interest in utilizing wireless cellular networks also for communications with machines, where there is no human interaction. Examples include utility meter-reading, vehicular communications, fire and security system sensors, vending machines, household appliances, and the like. These machine-type communications (MTC)—also referred to as "machine-to-machine (M2) communications," "networked society," and the "Internet of Things"—have significantly different characteristics than conventional radio telephony, and the evolution of wireless cellular networks towards the $5^{th}$ generation (5G) includes provisions for accommodating and optimizing MTC.

In particular, the Third Generation Partnership Program (3GPP) is currently defining three standards for MTC: LTE-MTC (also called LTE-M), Narrowband (NB) LTE-M, and Narrowband (NB) Internet of Things (IoT) or NB-IoT. The Long Term Evolution (LTE) channel comprises resource blocks of about 180 kHz. LTE-M utilizes a bandwidth of six resource blocks, or just over 1 MHz, with up to 2 Mbps data rates. In contrast, NB-LTE-M uses only one LTE resource block, for a bandwidth of 180 kHz, and data rates in the range of 200 kbps. Both LTE-M and NB-LTE-M are overlaid on the existing LTE channel. NB-IoT also uses one resource block and has a bandwidth of 180 kHz; however NB-IoT does not necessarily utilize the existing LTE channel. An NB-IoT carrier may be deployed within an LTE frequency band (in-band), in the frequencies below and above an LTE carrier that are within the allocated frequency band spectral mask, but are not used by the LTE carrier (guard-band), or in spectrum outside of any LTE frequency band (stand-alone). NB-IoT has similar bandwidth and data rates as NB-LTE-M, but targets lower device complexity and cost. These three MTC standards support different performance points, with respect to spectrum allocation, data rates, device cost, coverage density, and the like. As used herein, the term "machine-type communications" and the acronym MTC may refer to any of these standards (or other standards that support radio network devices having MTC characteristics as described herein).

In MTC, communication is characterized by lower demands on data rates than, e.g., mobile broadband. However, MTC has higher requirements on other characteristics. MTC devices require a very low cost, which can be achieved by low device complexity and reduced capabilities (e.g., only one receiving antenna, a narrow device bandwidth smaller than the system bandwidth, etc.). To be able to reach devices in challenging location, e.g. basements, it is desirable to enhance coverage in comparison to normal systems. The power consumption must be very low in order to prolong battery life such that interactive battery charging/changing is not required, preferably throughout the lifespan of the device.

Low device cost is achieved by low device complexity and reduced capabilities (e.g., only one receiving antenna, a narrow device bandwidth smaller than the system bandwidth, etc.). For example, in Rel-12, a lower complexity device category (Cat-0) was introduced to support lower manufacturing costs for MTC devices. In Rel-13, further complexity reductions are being introduced; the largest change is a reduced device bandwidth to six Physical Resource Blocks (PRB) or 1.4 MHz. This means that some legacy channels such as the Physical Downlink Control Channel (PDCCH), which spans over the entire system bandwidth, cannot be received by Cat-0 devices. The working assumption for these low complexity devices is to replace PDCCH with an updated version of Enhanced PDCCH (EPDCCH) transmitted only within 6 PRBs (referred to as M-PDCCH). The lower complexity of the devices means that a small number of repetitions might be needed for these devices in normal coverage. That is, the use of repetitions may necessary to counteract the losses from using only one receiving antenna (Rel-12), loss of frequency diversity (Rel-13), etc.

Because many MTC devices will be placed in locations with poor wireless network exposure, coverage enhancement is another goal of 5G standards to support MTC. Rel-13 MTC work is ongoing to support coverage enhancements of up to 15 dB. This is achieved by time repetition in a Transmission Time Interval (TTI) bundling manner, similar to that introduced for VoIP in Rel-8. In Rel-8, TTI bundling is limited to the uplink shared data channel and fixed to 4 repetitions. For Rel-13 MTC radio network devices requiring coverage enhancements, the number of repetitions can be configured per cell or per device, and will also be applied to the downlink. Link simulations show that the number of required repetitions can be in the order of 100 to achieve the targeted 15 dB gain for some channels.

The 3GPP standards also support the MTC goal of extended battery life. This is primarily accomplished by minimizing the signaling load for MTC devices. One such proposal relates to re-establishing a connection to the network following an idle period. The Radio Resource Control (RRC) protocol defines two modes for a radio network device: RRC Idle and RRC Connected. The RRC Connected mode includes four states (CELL_DCH, CELL_FACH, CELL_PCH, and URA_PCH) defining various capabilities and concomitant power consumption. When a device in RRC Connected mode ceases interactions with the network, upon the expiration of a timer it moves to RRC Idle mode, in which communication with the network is terminated and the device expends minimal power. At the base station (called eNB in LTE), the device connection "context"—the sum of technical information relating to the erstwhile air interface connection—is inactivated; it may be deleted or moved to another node for storage. When the device again requires interaction with the network, it performs an RRC Connection operation in which new parameters are established and a new context is created at the eNB.

One proposal to reduce the signaling load for MTC devices, arising from a Small Data and Device Triggering Enhancements (SDDTE) study, is an "RRC Connection Resume," or simply "RRC Resume" operation. In this case, the eNB provides the radio network device with a Resume ID during RRC Connected mode, and performs an RRC Suspend operation. After the device goes to RRC Idle mode, and later wishes to re-establish a connection, it may issue an RRC Resume Request, including its Resume ID. The eNB uses the Resume ID to access and retrieve the former context information. Using the former context, the eNB may re-establish a full RRC connection with, e.g., security and authentication, without the signaling normally required to establish a new connection.

The Background section of this document is provided to place embodiments of the present invention in technological and operational context, to assist those of skill in the art in understanding their scope and utility. Approaches descried in the Background section could be pursued, but are not necessarily approaches that have been previously conceived or pursued. Unless explicitly identified as such, no statement herein is admitted to be prior art merely by its inclusion in the Background section

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

According to one or more embodiments of the present invention described and claimed herein, in a wireless communication network that implements the RRC Resume procedure, an eNB sends to a radio network device, which was previously connected and has been given a Resume ID, a paging message or Random Access Response message including an RRC Resume directive. The RRC Resume directive comprises at least an indication whether or not the radio network device should perform an RRC Resume procedure. If the RRC Resume directive indicates the radio network device should not perform an RRC Resume procedure, the radio network device performs an RRC Connection procedure. If the RRC Resume directive indicates the radio network device should perform an RRC Resume procedure, the RRC Resume may include additional information to optimize or otherwise assist the RRC Resume procedure. In this manner, RRC Resume signaling is avoided when the eNB knows that it will not be successful, such as if a prior RRC connection context is not available or readily retrievable, or is invalid.

One embodiment relates to a method, performed by a radio network node operative in a wireless communication network, of optimizing the operative connection of a radio network device that was previously connected to the network. An RRC Resume directive is generated. The RRC Resume directive comprises one of an indication the radio network device should perform an RRC Resume procedure and including information relevant to the RRC Resume procedure, and an indication that the radio network device should not perform an RRC Resume procedure. The RRC Resume directive is included in one of a paging message and a Random Access Response message. The paging message or Random Access Response message containing the RRC Resume directive is sent to the radio network device.

Another embodiment relates to a radio network node operative in a wireless communication network. The radio network node includes one or more antennas and a transceiver operatively connected to the antennas. The node also includes processing circuitry operatively connected to the transceiver. The processing circuitry is operative to generate an RRC Resume directive comprising at least an indication whether or not the radio network device should perform an RRC Resume procedure; include the RRC Resume directive in one of a paging message and a Random Access Response message; and transmit the paging message or Random Access Response message containing the RRC Resume directive to the radio network device.

Yet another embodiment relates to a method, performed by a radio network device operative in a wireless communication network and that was previously connected to the network and was issued a Resume ID, of optimizing the re-connection of the device to a radio network node. One of a paging message and a Random Access Response, RAR, message is received from a radio network node. The paging or RAR message includes an RRC Resume directive comprising at least an indication whether or not the radio network device should perform an RRC Resume procedure. If the RRC Resume directive indicates the radio network device should perform an RRC Resume procedure, an RRC Resume Connection Request message, including the Resume ID, is sent to the radio network node to resume a prior RRC connection. If the RRC Resume directive indicates the radio network device should not perform an RRC Resume procedure, an RRC Connection Request message is sent to the radio network node to establish a new RRC connection.

Still another embodiment relates to a radio network device operative in a wireless communication network. The radio network device includes an antenna and a transceiver operatively connected to the antenna. The radio network device also includes processing circuitry operatively connected to the transceiver. The processing circuitry is operative to receive from the radio network node one of a paging message and a Random Access Response, RAR, message, the paging or RAR message including an RRC Resume directive comprising at least an indication whether or not the radio network device should perform an RRC Resume procedure; if the RRC Resume directive indicates the radio network device should perform an RRC Resume procedure, send an RRC Resume Connection Request message, including the Resume ID, to the radio network node to resume a prior RRC connection; and if the RRC Resume directive indicates the radio network device should not perform an RRC Resume procedure, send an RRC Connection Request message to the radio network node to establish a new RRC connection.

Yet another embodiment relates to a non-transitory computer-readable medium containing program instructions which, when executed in a radio network node operative in a wireless communication network, are operative to cause processing circuitry in the node to perform the steps of: generating an RRC Resume directive comprising at least an indication whether or not the radio network device should perform an RRC Resume procedure; including the RRC Resume directive in one of a paging message and a Random Access Response message; and transmitting the paging message or Random Access Response message containing the RRC Resume directive to the radio network device.

Yet another embodiment relates to a non-transitory computer-readable medium containing program instructions which, when executed in a radio network device operative in a wireless communication network, are operative to cause processing circuitry in the device to perform the steps of: receiving from the radio network node one of a paging message and a Random Access Response, RAR, message, the paging or RAR message including an RRC Resume directive comprising at least an indication whether or not the radio network device should perform an RRC Resume procedure; if the RRC Resume directive indicates the radio network device should perform an RRC Resume procedure, sending an RRC Resume Connection Request message, including the Resume ID, to the radio network node to resume a prior RRC connection; and if the RRC Resume directive indicates the radio network device should not perform an RRC Resume procedure, sending an RRC Connection Request message to the radio network node to establish a new RRC connection.

BRIEF DESCRIPTION OF THE DRAWINGS

The present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

DETAILED DESCRIPTION

For simplicity and illustrative purposes, the present invention is described by referring mainly to an exemplary embodiment thereof. In the following description, numerous specific details are set forth in order to provide a thorough understanding of the present invention. However, it will be readily apparent to one of ordinary skill in the art that the present invention may be practiced without limitation to these specific details. In this description, well known methods and structures have not been described in detail so as not to unnecessarily obscure the present invention.

Figure 1:
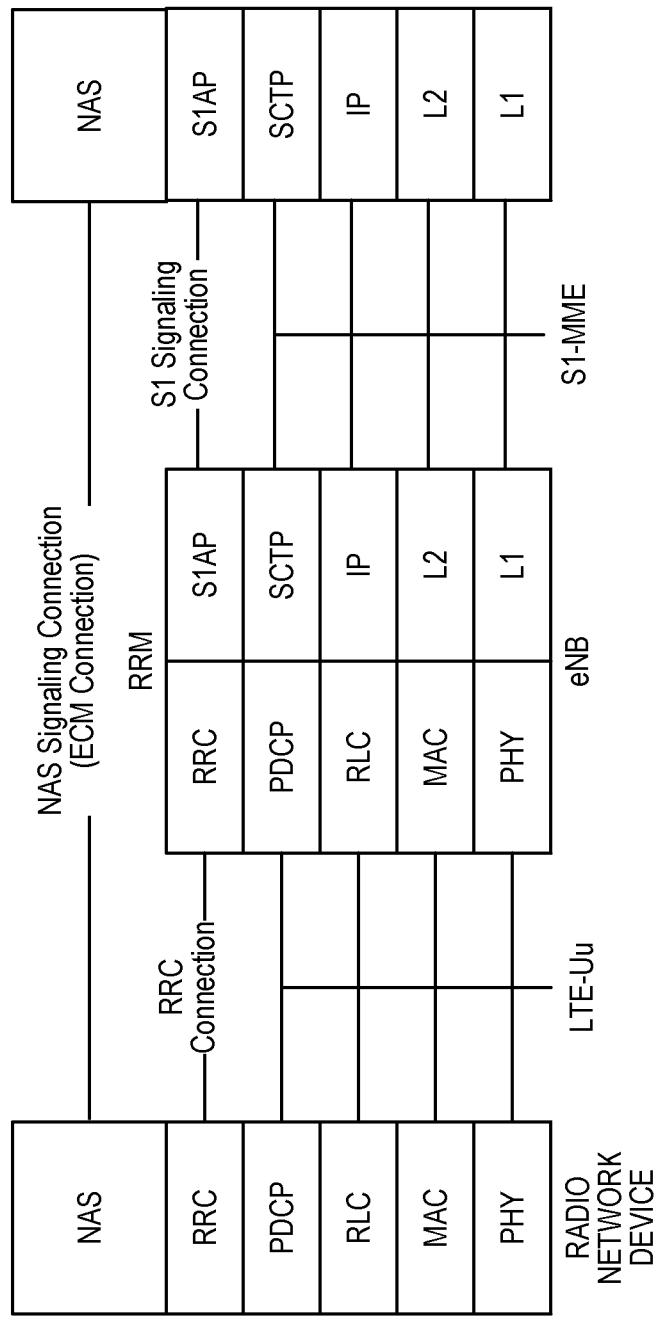
FIG. 1 is a network layer diagram.

FIG. 1 is a network layer diagram depicting a radio network device, a serving network node such an eNB, and a Mobility Management Entity (MME). The MME is a node in the core network responsible for many tasks related to managing the mobility of radio network devices, including paging, bearer activation, Serving Gateway (SGW) selection, authentication, cyphering/integrity protection, temporary ID generation and allocation, and the like. The Non Access Stratum (NAS) is a functional layer in the LTE protocol stack between the core network and a radio network device. The NAS is a protocol for the transparent passing of messages between a radio network device and core network nodes (e.g., Mobile Switching Center, Serving GPRS Support Node, etc.). NAS signaling terminates at the MME.

Underlying the NAS layer, between a radio network device and a serving node such as an eNB, is the Radio Resource Control (RRC) protocol. The RRC handles the control plane signaling of Layer 3 between the radio network device and the Radio Access Network (RAN). The eNB maintains an active RRC connection with radio network devices in RRC Connected mode. When a device is inactive and an RRC timer expires, the device transitions to the (very low power) RRC Idle mode, and the eNB deletes, stores, or archives the connection "context," which comprises information about the RRC Connection (e.g., IDs, security and authentication, bearer information, and the like). An S1 signaling connection serves a similar function as RRC, but between the eNB and MME.

Figure 2:
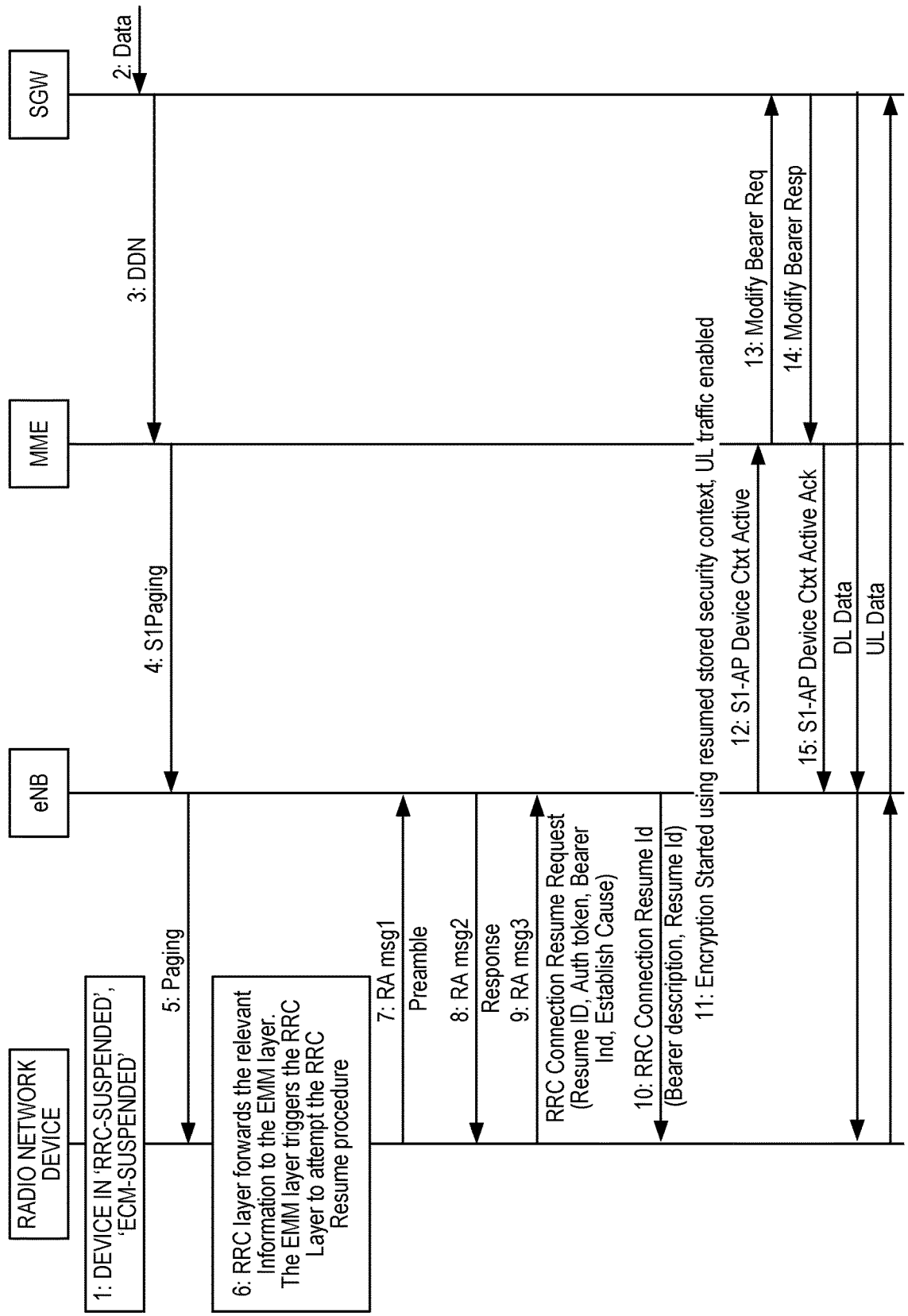
FIG. 2 is a signaling diagram depicting the RRC Resume procedure.

As described above, an RRC Resume procedure is defined for MTC radio network devices, with the goal of reducing signaling required when re-establishing an RRC connection. FIG. 2 is a signaling diagram depicting the RRC Resume procedure. Initially (1), the radio network device is in RRC Idle mode, and ECM Suspended mode (Evolved Packet System (EPS) Connection Management (ECM) is the signaling connection for exchanging NAS messages between the radio network device and MME). A Serving Gateway (SGW) receives data (2) directed to a radio network device. The SGW sends (3) a Downlink Data Notification to the MME. The MME sends (4) an S1Paging message to one or more eNBs. The eNB pages (5) the radio network device over the air interface. In the radio network device matching the ID in the paging message, an RRC layer forwards (6) the relevant information to the EPS Mobility Management (EMM) layer. The EMM layer triggers the RRC layer to perform an RRC Resume procedure. The radio network device sends (7) a randomly selected Random Access (RA) Preamble on the Random Access Channel (RACH) in msg1, per legacy connection procedures. The eNB responds (8) with an RA Response on DL-SCH in msg2, per legacy connection procedures.

Rather than engage in a conventional RRC Connection Request/Response handshake, the radio network device sends (9) a RRC Resume Request in msg3. The device includes its Resume ID, Authentication Token, Bearer Indication, and Establishment Cause. The eNB uses the Resume ID from the RRC Resume Request to retrieve the radio network device's RRC connection context. The eNB responds (10) with a RRC Resume Complete in msg4. The RRC Resume Complete message indicates which bearers are resumed, and includes the Resume ID and updated L2/L1 parameters, if applicable. With the radio network device's context restored, encryption is started (11) and uplink traffic is enabled.

The eNB notifies (12) the MME about the radio network device's RRC mode change in a new S1AP message designated here as S1-AP device Context Active indicating "page response." The ECM in the MME enters the ECM-CONNECTED state. The MME identifies that the radio network device re-established connection at the eNB for which the MME has stored information about allocated downlink Tunnel Endpoint Identifiers (TEID) for the radio network device. The MME sends (13) a Modify Bearer Request message (including eNB address, S1 TEID(s) (DL) for the accepted EPS bearers, Delay Downlink Packet Notification Request, and RAT Type) per PDN connection to the SGW. If the SGW supports Modify Access Bearers Request procedure and if there is no need for the SGW to send the signalling to the Packet Data Network Gateway (PGW), the MME may send Modify Access Bearers Request (including eNB address(es) and TEIDs for downlink user plane for the accepted EPS bearers, and Delay Downlink Packet Notification Request) per radio network device to the SGW to optimize the signalling. The SGW is now able to transmit downlink data towards the radio network device. The SGW considers radio network device to be in Connected mode. The SGW sends (14) a Modify Bearer Response to the MME. The MME sends (15) a S1-AP device Context Active Acknowledgement to the eNB.

The radio network device is now connected and configured through to the SGW, and may exchange uplink and downlink data across the network. By performing the RRC Resume procedure and re-activating a prior RRC connection context, the radio network device, eNB, and MME are able to avoid performing many signaling steps associated with a legacy RRC Connection Request handshake, such as authentication, configuration, the allocation of bearers, and the like. The goal is to assist MTC radio network devices conserve battery power, by reducing the signal load for those making infrequent connections, and which spend significant time in RRC Idle mode.

Although described herein in the context of 3GPP LTE, the RRC Resume operation concept could be implemented in other wireless communication networks. In general, as used herein, "RRC Resume" refers to any re-activation of a connection between a radio network device and the network, in which a some or all of the information associated with the implementation of a prior connection, needed for connected state operation (and referred to herein as a "context"), may be retrieved by a network node an used in lieu of re-establishing the context information via signaling. In general, RRC Resume operations should reduce latency and reduce the amount of signaling required to re-establish an erstwhile connection.

However, there are some situations in which the RRC Resume procedure is not only sub-optimal, but actually results in increased signaling as compared to a legacy RRC Connection Request operation. For example, if the eNB deleted a radio network device's RRC connection context, or if it is stored at another network node and cannot be timely retrieved, then the RRC Resume procedure is not possible. Even if the eNB has (or can timely retrieve) the context, it may not be useable. For example, if significant time has passed since the last RRC connection, some data in the context, such as cypher keys used for encryption, authentication, or integrity verification, may have become "stale." Since these will need to be re-generated, the stored RRC connection context cannot be used to implement the RRC Resume procedure. In these cases, however, the radio network device has no knowledge of the presence, accessibility, or validity of the RRC connection context at the eNB, and hence attempts an RRC Resume procedure every time.

Figure 3:
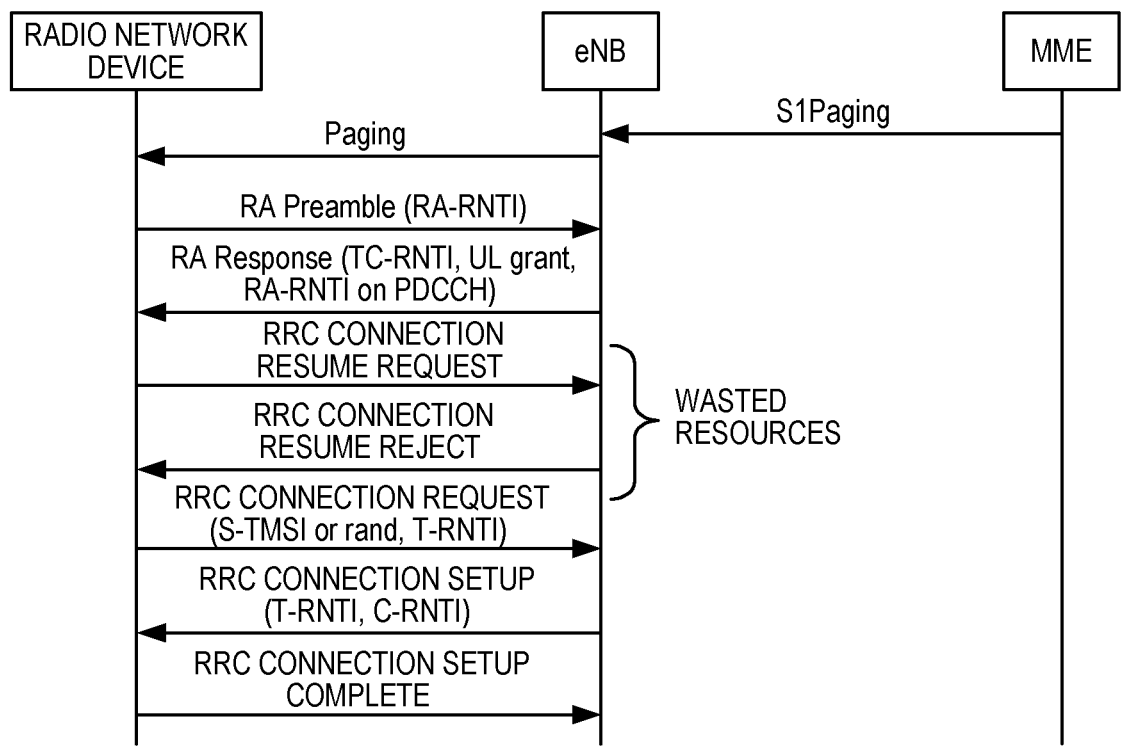
FIG. 3 is a signaling diagram depicting a failed RRC Resume procedure.

FIG. 3 depicts this situation for the case of the network sending traffic to a radio network device in RRC Idle and ECM Suspended modes. The MME sends an S1 paging message to (at least) the prior serving eNB, which sends a paging message identifying the desired radio network device. The device sends an RA Preamble to the eNB, including a Radio Access Radio Network Temporary Identifier (RA-RNTI). The eNB responds with a RA Response message, including the RA-RNTI, a Temporary Cell RNTI (TC-RNTI), and an UL grant. The radio network device then attempts a RRC Resume procedure for maximum efficiency. However, since the RRC connection context is unavailable or unusable at the eNB, the eNB responds with an RRC Resume Reject message. The radio network device then proceeds with a legacy RRC Connection Request, receives an RRC Connection Setup message, and responds with an RRC Connection Setup Complete message. In this case, the RRC Resume Request and RRC Resume Reject are wasted signaling (in addition to the associated wasted processing, which also consumes power in the radio network device).

Many projected MTC use cases assume predominately mobile originated (MO) traffic—in which the radio network device initiates contact with the network to upload some data, or request instructions. However, it is likely that many MTC use cases will, in practice, include significant mobile terminated (MT) traffic—in which a control entity initiates contact with the radio network device across the network, such as for software update, to command actuators, for reconfiguration, device switch on/off, request for device sensing/reading, request to send uplink report, device warning, and other reasons. As depicted in FIG. 2, MT traffic to a radio network device in RRC Idle and EMC Suspended modes results in paging by at least the device's last serving eNB. Accordingly, the paging message presents an opportunity in advance of the radio network device attempting to re-establish its RRC connection to advise the radio network device regarding the viability of the RRC Resume procedure. Another such opportunity, which applies in the case of both MO and MT traffic, is the Random Access Response (RAR) message which the eNB sends to the radio network device in response to the RA Preamble, which is also prior to the device RRC connection signaling.

According to embodiments of the present invention, the eNB includes, within a paging message sent to a radio network device for MT traffic or a RAR sent in response to an RA Preamble, an "RRC Resume directive." As used herein, an RRC Resume directive is at least an indication whether or not the radio network device should not perform an RRC Resume procedure (and may include additional data, as described herein).

Figure 4:
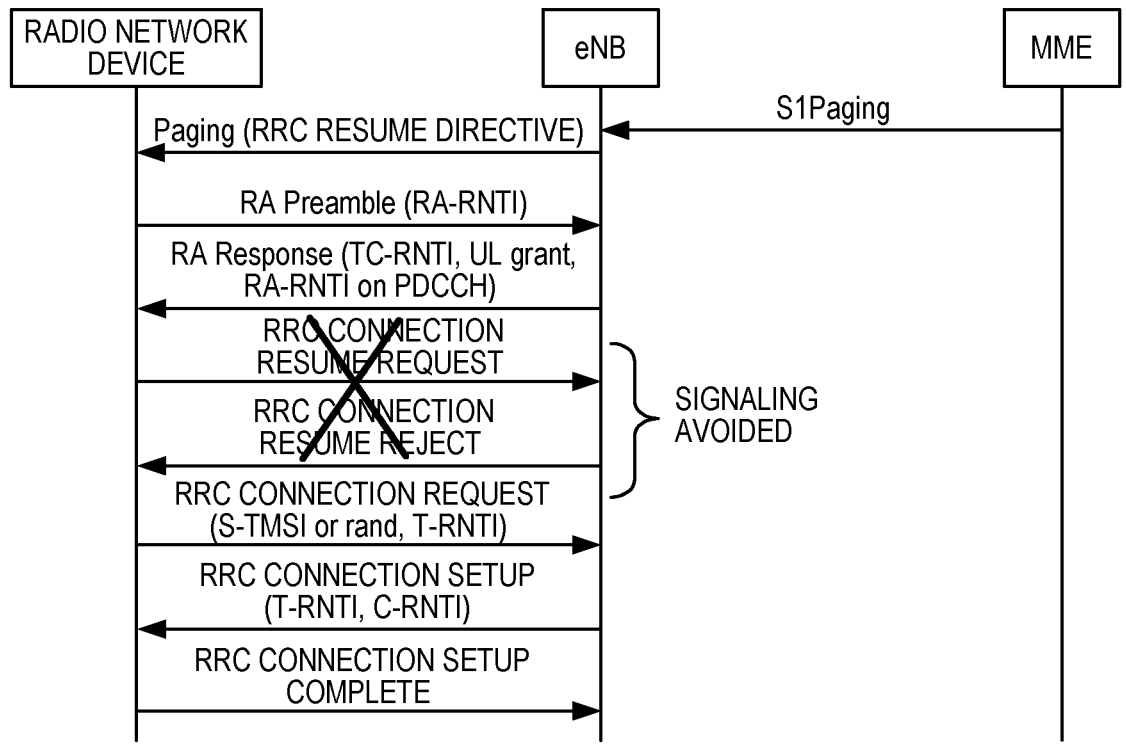
FIG. 4 is a signaling diagram depicting an avoided RRC Resume procedure.

FIG. 4 depicts another MT traffic case. The MME sends an S1 paging message to the eNB. In this case, the RRC connection context is available at the eNB, but is unusable due to needing a fresh cypher key. Accordingly, the eNB inserts an RRC Resume directive into the paging message indicating to the radio network device that is should not perform an RRC Resume procedure, but rather should perform a legacy RRC Connection handshake. Following the RA handshake, the radio network device sends an RRC Connection Request, and goes through the legacy RRC connection operation, including being issued a fresh cypher key. As indicated by the "X" in FIG. 4, the radio network device does not waste time or battery power engaging in RRC Resume signaling, which the eNB knows in advance will be unsuccessful.

In one embodiment, the RRC Resume directive is included in the RAR message the eNB sends to the radio network device in response to a RA Preamble. In this embodiment, the eNB may advise the device of whether or not to attempt an RRC Resume procedure even in the case of MO traffic. In the case of MT traffic, the eNB may include the RRC Resume directive in either a paging message or an RAR message.

In one embodiment, the RRC Resume directive does not indicate that the radio network device should not attempt an RRC Resume procedure, but rather that it should, in response to the serving network node having a valid and accessible context for the UE. In one embodiment, the RRC Resume directive indicates that the radio network device should attempt an RRC Resume procedure, and additionally includes information relevant to the RRC Resume procedure. For example, the RRC Resume directive may include information on whether or not a previously established a Robust Header Compression (ROHC) context can be re-used in the RRC Resume. If so, transmission of the full header can be avoided for the first transmission. It may be advantageous to explicitly signal this information, as ROHC implementation can vary between eNBs. As other examples, the RRC Resume directive may include information such as an authentication token, a bearer description, or a Resume ID.

In the simplest case, where the sole purpose of the RRC Resume directive is to advise the radio network device whether or not to attempt an RRC Resume procedure, the RRC Resume directive may comprise a single bit. More generally, and in particular where the RRC Resume directive is used to convey information to the radio network device, it may comprise an Information Element (IE), or any other appropriate data structure, such as a container. The latter may be particularly useful if it is not desired to standardize the information sent. Both the content of a container, and whether it is understood or ignored by an entity or protocol layer, may be left to the implementation, thus providing greater flexibility and system differentiability.

Figure 5:
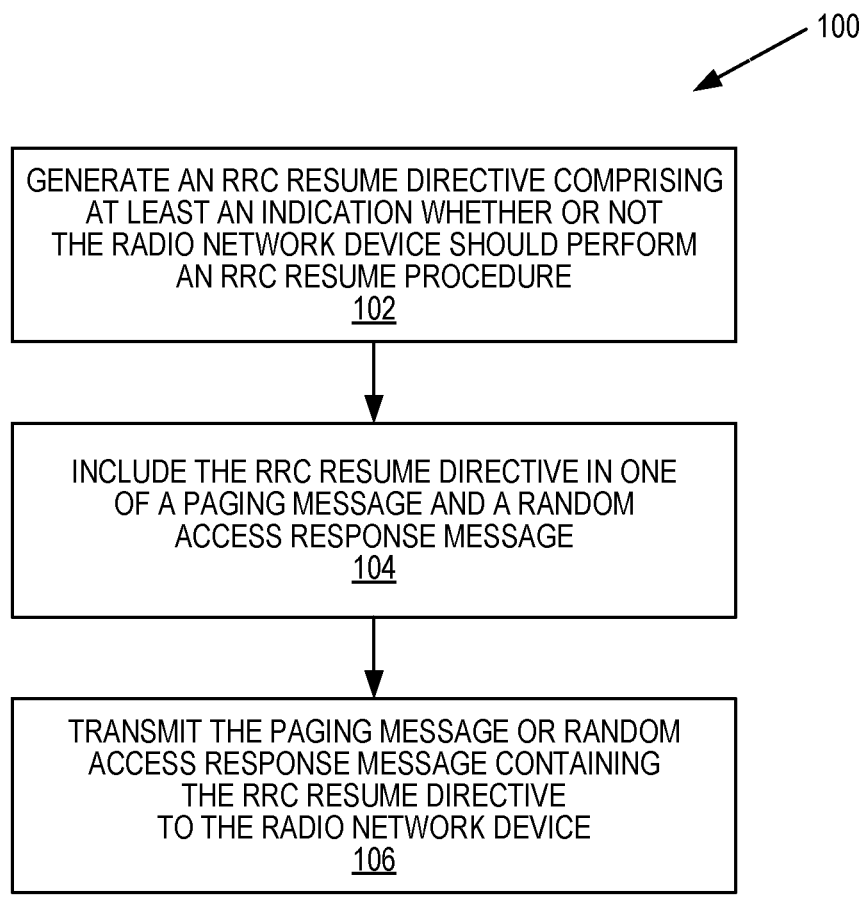
FIG. 5 is a flow diagram of a method of directing a radio network device whether or not to attempt an RRC Resume procedure.

FIG. 5 depicts a method 100, performed by a radio network node operative in a wireless communication network, of optimizing the operative connection of a radio network device that was previously connected to the network. Based on the availability and validity of an RRC connection context at the radio network node, it generates an RRC Resume directive (block 102). The RRC Resume directive comprises one of an indication the radio network device should perform an RRC Resume procedure and optionally including information relevant to the RRC Resume procedure, and an indication that the radio network device should not perform an RRC Resume procedure. The radio network node then includes the RRC Resume directive in one of a paging message and a Random Access Response message (block 104). Finally, the radio network node transmits the paging message or Random Access Response message containing the RRC Resume directive to the radio network device (block 106). The radio network device may then perform or suppress an RRC Resume procedure, in response to the RRC Resume directive.

Figure 6:
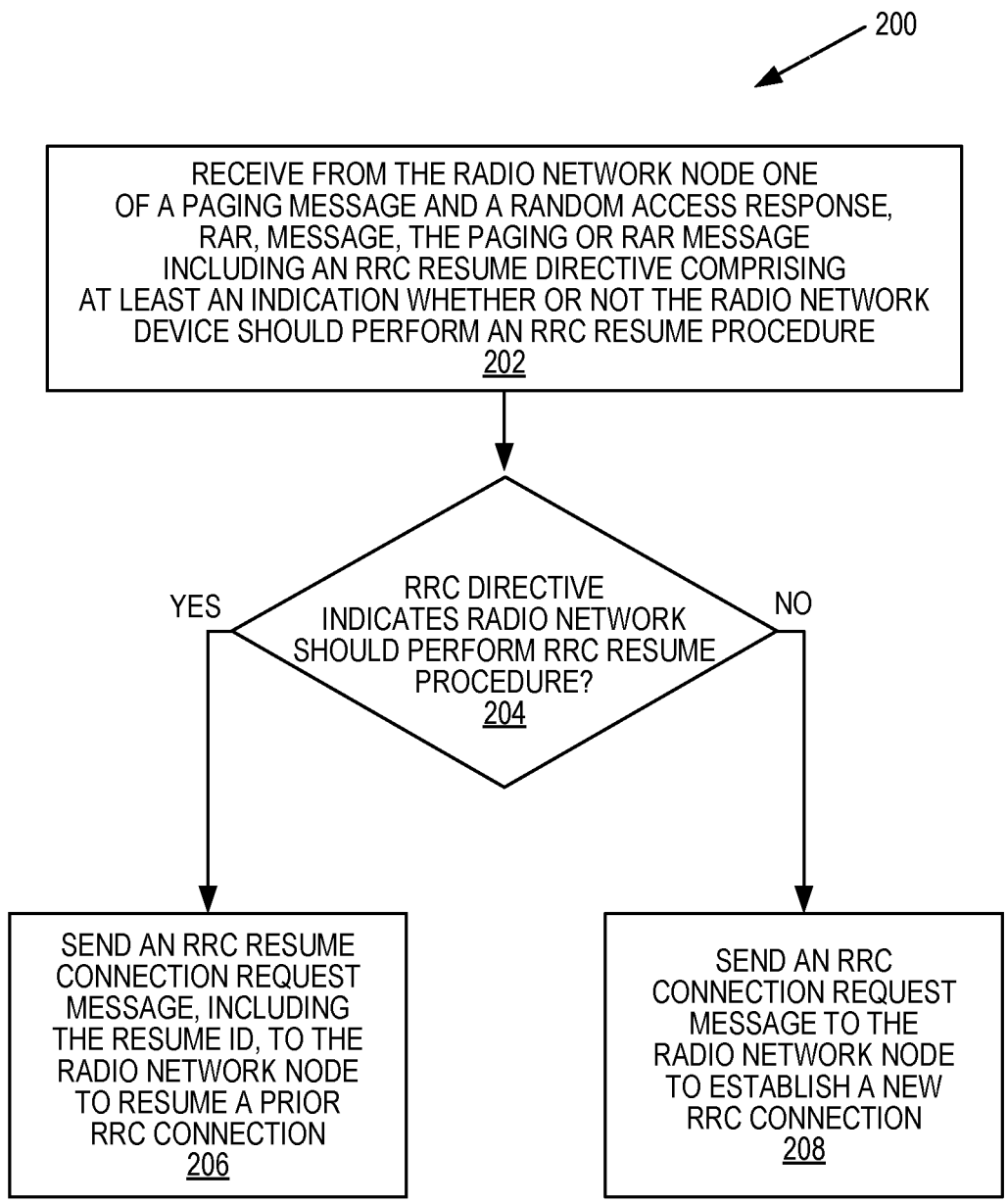
FIG. 6 is a flow diagram of a method of attempting an RRC Resume procedure or not in response to receiving an RRC Resume directive.

FIG. 6 depicts a method 200, performed by a radio network device operative in a wireless communication network, and that was previously connected to the network and was issued a Resume ID, of optimizing the re-connection of the device to a radio network node. The radio network device receives from the radio network node one of a paging message and a Random Access Response (RAR) message, the paging or RAR message including an RRC Resume directive comprising at least an indication whether or not the radio network device should perform an RRC Resume procedure (block 202). If the RRC Resume directive indicates the radio network device should perform an RRC Resume procedure (block 204), the radio network device sends an RRC Resume Connection Request message, including the Resume ID, to the radio network node to resume a prior RRC connection (block 206). On the other hand, if the RRC Resume directive indicates the radio network device should not perform an RRC Resume procedure (block 204), the radio network device sends an RRC Connection Request message to the radio network node to establish a new RRC connection (block 208).

Figure 7:
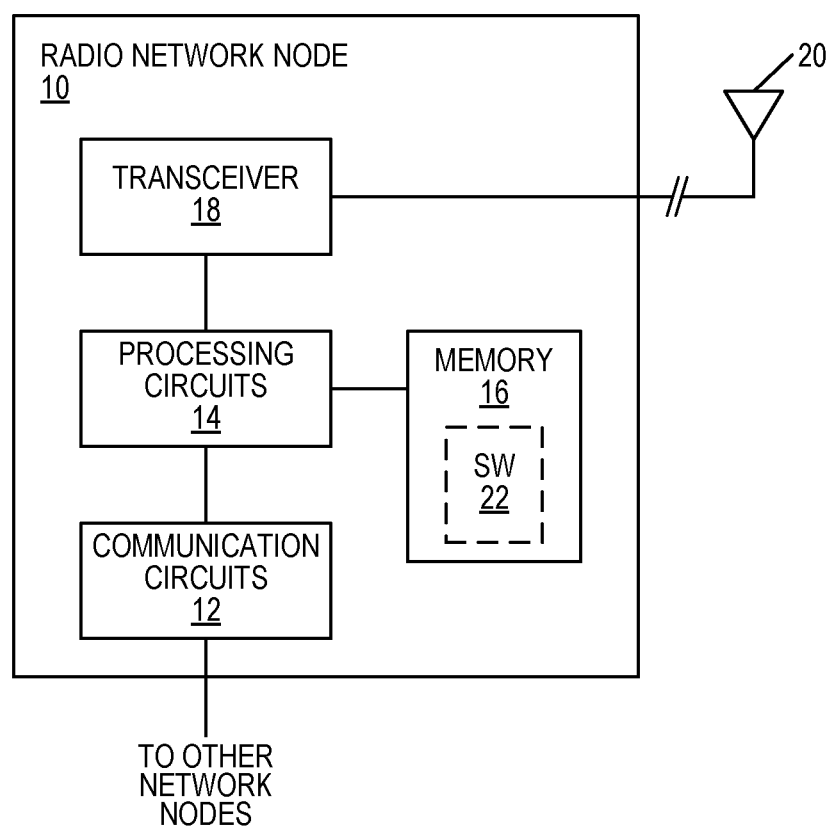
FIG. 7 is a block diagram of a radio network node.

FIG. 7 depicts a radio network node 10 operative in a wireless communication network. The radio network node 10 includes communication circuits 12 operative to exchange data with other network nodes; processing circuitry 14; memory 16; and radio circuits, such as a transceiver 18, one or more antennas 20, and the like, to effect wireless communication across an air interface to one or more radio network devices. As indicated by the broken connection to the antenna(s) 20, the antenna(s) may be physically located separately from the radio network node 10, such as mounted on a tower, building, or the like. Although the memory 16 is depicted as being separate from the processing circuitry 14, those of skill in the art understand that the processing circuitry 14 includes internal memory, such as a cache memory or register file. Those of skill in the art additionally understand that virtualization techniques allow some functions nominally executed by the processing circuitry 14 to actually be executed by other hardware, perhaps remotely located (e.g., in the so-called "cloud").

According to one embodiment of the present invention, the processing circuitry 14 includes circuits operative to cause the radio network node 10 to include an RRC Resume directive in a downlink message to a radio network device, prior to the radio network device attempting to re-establish a connection to the radio network node, as described and claimed herein. In particular, circuits in the processing circuitry 14 are operative to perform the method 100 described and claimed herein. This allows the radio network node 10, which has ascertained that, for example, an RRC connection context is unavailable or unusable, to prevent the radio network device from wasting resources engaging in RRC Resume signaling.

According to another embodiment of the present invention, the memory 16 is operative to store, and the processing circuitry 14 is operative to execute, software 22 which when executed is operative to cause the radio network node 10 to include an RRC Resume directive in a downlink message to a radio network device, prior to the radio network device attempting to re-establish a connection to the radio network node, as described and claimed herein. In particular, the software 22, when executed on the processing circuitry 14, is operative to perform the method 100 described and claimed herein. This allows the radio network node 10, which has ascertained that, for example, an RRC connection context is unavailable or unusable, to prevent the radio network device from wasting resources engaging in RRC Resume signaling.

Figure 8:
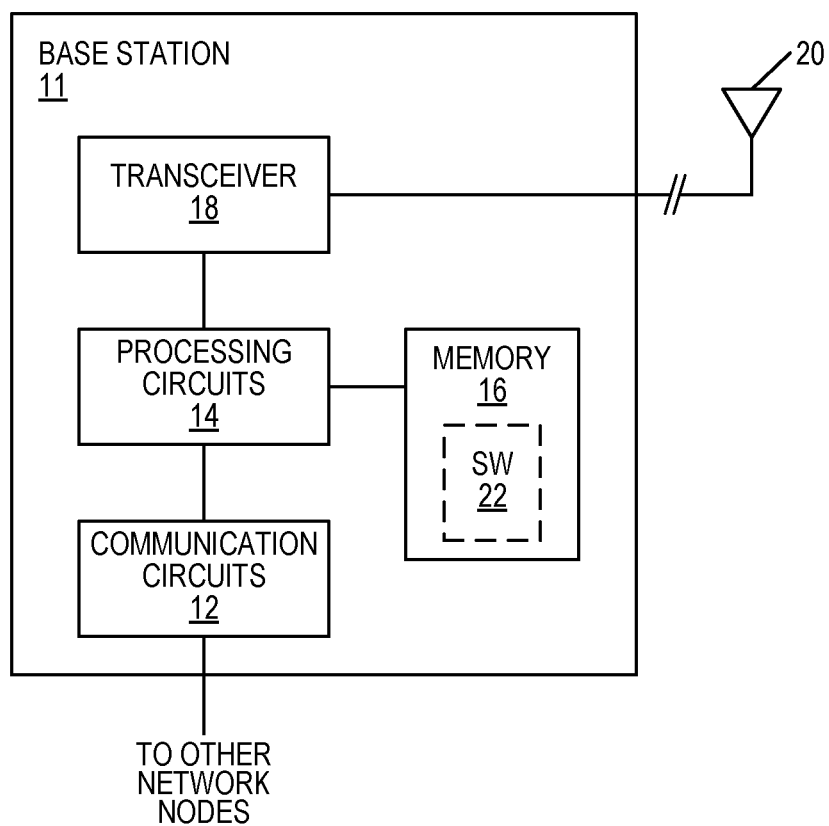
FIG. 8 is a block diagram of an eNB.

FIG. 8 depicts an embodiment in which the radio network node 10 of FIG. 7 is a base station 11 providing wireless communication services to one or more radio network devices in a geographic region (known as a cell or sector). A base station in LTE is called an e-NodeB or eNB; however the present invention is not limited to LTE or eNBs.

Figure 9:
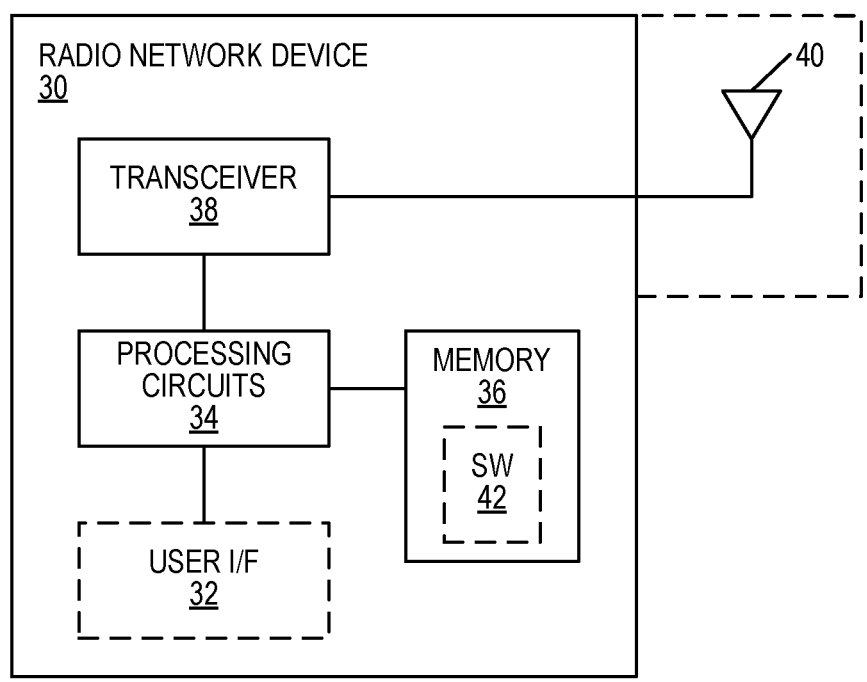
FIG. 9 is a block diagram of a radio network device.

FIG. 9 depicts a radio network device 30 operative in embodiments of the present invention. A radio network device 30 is any type device capable of communicating with a radio network node 10 and/or base station 11 over radio signals. A radio network device 30 may therefore refer to a machine-to-machine (M2M) device, a machine-type communications (MTC) device, a Narrowband Internet of Things (NB-IoT) device (in particular a UE implementing the 3GPP standard for NB-IOT), etc. The radio network device may also be a User Equipment (UE); however it should be noted that the UE does not necessarily have a "user" in the sense of an individual person owning and/or operating the device. A radio network device may also be referred to as a radio device, a radio communication device, a wireless communication device, a wireless terminal, or simply a terminal—unless the context indicates otherwise, the use of any of these terms is intended to include device-to-device UEs or devices, machine-type devices or devices capable of machine-to-machine communication, sensors equipped with a radio network device, wireless-enabled table computers, mobile terminals, smart phones, laptop-embedded equipped (LEE), laptop-mounted equipment (LME), USB dongles, wireless customer-premises equipment (CPE), etc. In the discussion herein, the terms machine-to-machine (M2M) device, machine-type communication (MTC) device, wireless sensor, and sensor may also be used. It should be understood that these devices may be UEs, but may be configured to transmit and/or receive data without direct human interaction.

A radio network device 30 as described herein (such as a user equipment) may be, or may be comprised in, a machine or device that performs monitoring or measurements, and transmits the results of such monitoring measurements to another device or a network. Particular examples of such machines are power meters, industrial machinery, or home or personal appliances, e.g. refrigerators, televisions, personal wearables such as watches etc. In other scenarios, a wireless communication device as described herein may be comprised in a vehicle and may perform monitoring and/or reporting of the vehicle's operational status or other functions associated with the vehicle.

In some embodiments, the radio network device 30 includes a user interface 32 (display, touchscreen, keyboard or keypad, microphone, speaker, and the like); in other embodiments, such as in many M2M, MTC or NB-IoT scenarios, the radio network device 30 may include only a minimal, or no, user interface 32 (as indicated by the dashed lines of block 32 in FIG. 9). The radio network device 30 also includes processing circuitry 34; memory 36; and radio circuits, such a transceiver 38, one or more antennas 40, and the like, to effect wireless communication across an air interface to one or more radio network nodes 10. As indicated by the dashed lines, the antenna(s) 40 may protrude externally from the radio network device 30, or the antenna(s) 40 may be internal.

According to one embodiment of the present invention, the processing circuitry 34 includes circuits operative to cause the radio network device 30 to avoid wasting resources on signaling associated with an RRC Resume procedure, in response to an indication from the network that such procedure will not be successful, as described and claimed herein. In particular, circuits in the processing circuitry 34 are operative to perform the method 200 described and claimed herein. This allows the radio network device 30, in response to an RRC Resume directive received from the network, to select the optimal RRC (re)connection procedure.

According to another embodiment of the present invention, the memory 36 is operative to store, and the processing circuitry 34 operative to execute, software 42 which when executed is operative to cause the radio network device 30 to avoid wasting resources on signaling associated with an RRC Resume procedure, in response to an indication from the network that such procedure will not be successful, as described and claimed herein. In particular, the software 42, when executed on the processing circuitry 34, is operative to perform the method 200 described and claimed herein. This allows the radio network device 30, in response to an RRC Resume directive received from the network, to select the optimal RRC (re)connection procedure.

Figure 10:
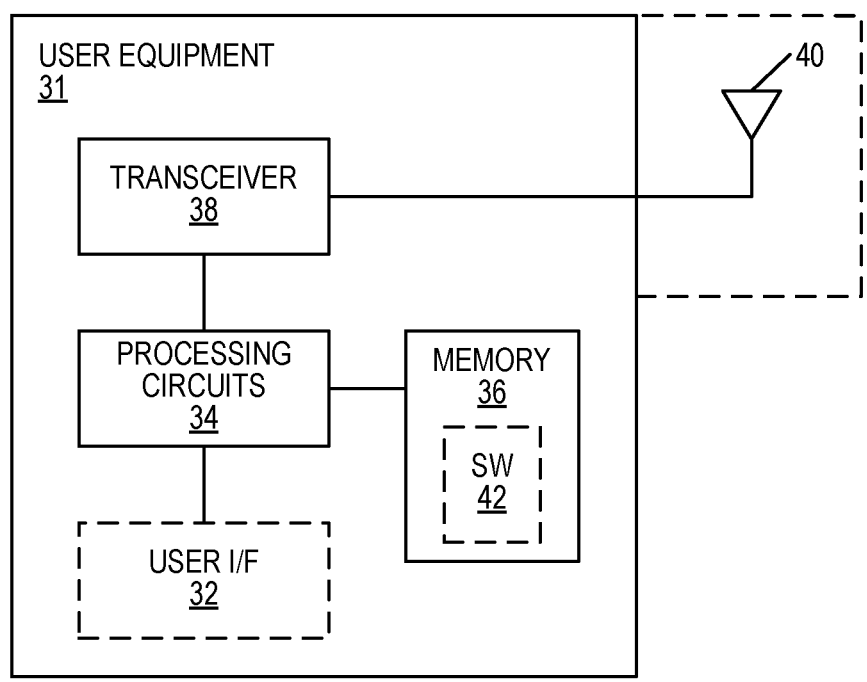
FIG. 10 is a block diagram of a UE.

FIG. 10 depicts an embodiment in which the radio network device 30 is a User Equipment (UE) 31. In some embodiments, the UE 31 may additionally include features such as a battery, a camera, removable memory interface, short-range communication interface (Wi-Fi, Bluetooth, and the like), wired interface (USB), battery recharge port, and the like (these features are not shown in FIG. 10).

In all embodiments, the processing circuitry 14, 34 may comprise any sequential state machine operative to execute machine instructions stored as machine-readable computer programs in memory 16, 36, such as one or more hardware-implemented state machines (e.g., in discrete logic, FPGA, ASIC, etc.); programmable logic together with appropriate firmware; one or more stored-program, general-purpose processors, such as a microprocessor or Digital Signal Processor (DSP), together with appropriate software; or any combination of the above.

In all embodiments, the memory 16, 36 may comprise any non-transitory machine-readable media known in the art or that may be developed, including but not limited to magnetic media (e.g., floppy disc, hard disc drive, etc.), optical media (e.g., CD-ROM, DVD-ROM, etc.), solid state media (e.g., SRAM, DRAM, DDRAM, ROM, PROM, EPROM, Flash memory, solid state disc, etc.), or the like.

In all embodiments, the radio circuits may comprise one or more transceivers 18, 38 used to communicate with one or more other transceivers via a Radio Access Network (RAN) according to one or more communication protocols known in the art or that may be developed, such as IEEE 802.xx, CDMA, WCDMA, GSM, LTE, UTRAN, WiMax, NB-IoT, or the like. The transceiver 18, 38 implements transmitter and receiver functionality appropriate to the RAN links (e.g., frequency allocations and the like). The transmitter and receiver functions may share circuit components and/or software, or alternatively may be implemented separately.

In all embodiments, the communication circuits 12 may comprise a receiver and transmitter interface used to communicate with one or more other nodes over a communication network according to one or more communication protocols known in the art or that may be developed, such as Ethernet, TCP/IP, SONET, ATM, IMS, SIP, or the like. The communication circuits 12 implement receiver and transmitter functionality appropriate to the communication network links (e.g., optical, electrical, and the like). The transmitter and receiver functions may share circuit components and/or software, or alternatively may be implemented separately.

Figure 11:
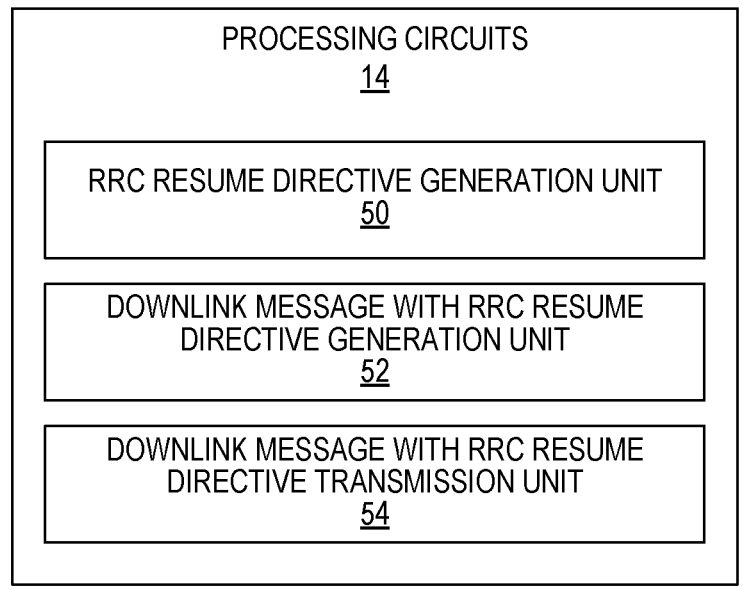
FIG. 11 is a block diagram of exemplary processing circuitry in a radio network node.

FIG. 11 illustrates example processing circuitry 14, such as that in the radio network node 10 of FIG. 7. The processing circuitry 14 comprises a plurality of physical units. In particular, the processing circuitry 14 comprises an RRC Resume directive generation unit 50, a downlink message with RRC Resume directive generation unit 52, and a downlink message with RRC Resume directive transmission unit 54. The RRC Resume directive generation unit 50 is configured to generate an RRC Resume directive comprising at least an indication whether or not the radio network device 30 should perform an RRC Resume procedure. The downlink message with RRC Resume directive generation unit 52 is configured to generate one of a paging message including the RRC Resume directive and a Random Access Response message including the RRC Resume directive. The downlink message with RRC Resume directive transmission unit 54 is configured to transmit the paging message or Random Access Response message containing the RRC Resume directive to the radio network device 30.

Figure 12:
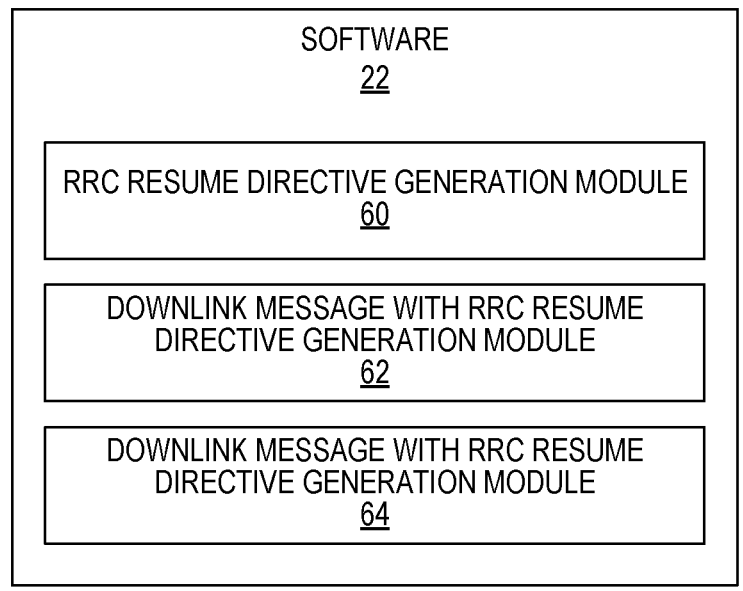
FIG. 12 is a block diagram of exemplary software executed by processing circuitry in a radio network node.

FIG. 12 illustrates example software 22, such as that depicted in the memory 16 of the radio network node 10 of FIG. 7. The software 22 comprises a plurality of software modules. In particular, the software 22 comprises an RRC Resume directive generation module 60, a downlink message with RRC Resume directive generation module 62, and a downlink message with RRC Resume directive transmission module 64. The RRC Resume directive generation module 60 is configured to generate an RRC Resume directive comprising at least an indication whether or not the radio network device 30 should perform an RRC Resume procedure. The downlink message with RRC Resume directive generation module 62 is configured to generate one of a paging message including the RRC Resume directive and a Random Access Response message including the RRC Resume directive. The downlink message with RRC Resume directive transmission module 64 is configured to transmit the paging message or Random Access Response message containing the RRC Resume directive to the radio network device 30.

Embodiments of the present invention provide numerous advantages over the prior art. In cases where a former RRC connection context has been deleted, or is not timely available, or has expired or is otherwise invalid, the network may advise a radio network device 30 to avoid the RRC Resume procedure, which would be wasted signaling (since an RRC Resume Request would be denied), and to proceed directly to a legacy RRC Connection procedure. This reduces the re-connection time particularly in poor coverage cases where numerous repetitions are necessary. It also reduces the signaling load, and hence preserves radio network device battery power. In some cases, the RRC Resume directive sent by the network may include additional information useful to the radio network device 30, which may further reduce the signaling load required or otherwise improve the process of re-establishing an RRC Connection.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method, performed by a radio network node operative in a wireless communication network, of handling re-connection of a radio network device that was previously connected to the wireless communication network, the method comprising:
generating, based on availability and validity of a Radio Resource Control (RRC) connection context at the radio network node, an RRC Resume directive comprising at least an indication whether or not the radio network device should perform an RRC Resume procedure;
including the RRC Resume directive in one of a paging message and a Random Access Response message; and
transmitting the paging message or the Random Access Response message containing the RRC Resume directive to the radio network device,
wherein when the RRC connection context associated with the radio network device is available and valid, and in response, generating the RRC Resume directive indicating that the radio network device should perform the RRC Resume procedure,
wherein the RRC Resume directive additionally includes information relevant to the RRC Resume procedure, and
wherein the information relevant to the RRC Resume procedure includes whether a previously established Robust Header Compression context can be re-used in the RRC Resume procedure.

2. The method of claim 1, wherein the information relevant to the RRC Resume procedure includes one or more of: an authentication token, a bearer description, an RRC Resume identification.

3. The method of claim 1, further comprising ascertaining that the RRC connection context associated with the radio network device is unavailable or invalid, and in response, generating the RRC Resume directive indicating that the radio network device should not perform the RRC Resume procedure.

4. The method of claim 1, further comprising receiving traffic to be delivered to the radio network device, wherein the paging message or the Random Access Response message containing the RRC Resume directive is a paging message sent to the radio network device to establish a connection for the purpose of delivering the traffic.

5. The method of claim 1, further comprising receiving a Random Access Preamble message from the radio network device, wherein the paging message or the Random Access Response message containing the RRC Resume directive is a Random Access Response message sent to the radio network device in response to the Random Access Preamble message.

6. A radio network node operative in a wireless communication network, the radio network node comprising:
one or more antennas;
a transceiver operatively connected to the one or more antennas; and
processing circuitry operatively connected to the transceiver, and operative to:
generate, based on availability and validity of a Radio Resource Control (RRC) connection context at the radio network node, an RRC Resume directive comprising at least an indication whether or not a radio network device should perform an RRC Resume procedure;
include the RRC Resume directive in one of a paging message and a Random Access Response message; and
transmit the paging message or the Random Access Response message containing the RRC Resume directive to the radio network device,
wherein the RRC Resume directive indicates that the radio network device should perform the RRC Resume procedure, and further includes information relevant to the RRC Resume procedure, and
wherein the information relevant to the RRC Resume procedure comprises information on whether or not a previously established Robust Header Compression context can be re-used in the RRC Resume procedure.

7. The radio network node of claim 6, wherein the processing circuitry is further operative to ascertain that the RRC connection context associated with the radio network device is unavailable or invalid, wherein the RRC Resume directive indicates that the radio network device should not perform the RRC Resume procedure.

8. The radio network node of claim 6, wherein the processing circuitry is further operative to receive traffic to be delivered to the radio network device, wherein the paging message or the Random Access Response message containing the RRC Resume directive is a paging message sent to the radio network device to establish a connection for the purpose of delivering the traffic.

9. The radio network node of claim 6, wherein the processing circuitry is further operative to receive a Random Access Preamble message from the radio network device, wherein the paging message or the Random Access Response message containing the RRC Resume directive is a Random Access Response message sent to the radio network device in response to the Random Access Preamble message.

10. The radio network node of claim 6, wherein the radio network node is a base station.

11. A method, performed by a radio network device operative in a wireless communication network and that was previously connected to the wireless communication network and was issued a Resume ID associated with the connection, of handling re-connection of the radio network device to a radio network node, the method comprising:
   receiving, from the radio network node, one of a paging message and a Random Access Response (RAR) message, the paging or the RAR message including a Radio Resource Control (RRC) Resume directive comprising at least an indication whether or not the radio network device should perform an RRC Resume procedure;
   when the RRC Resume directive indicates that the radio network device should perform the RRC Resume procedure, sending an RRC Resume Connection Request message, including the Resume ID, to the radio network node to resume a prior RRC connection;
   when the RRC Resume directive indicates that the radio network device should not perform the RRC Resume procedure, sending an RRC Connection Request message to the radio network node to establish a new RRC connection, and
   wherein the RRC Resume directive indicates that the radio network devices should not perform the RRC Resume procedure based on at least one of: the RRC connection context has been deleted, the RRC connection is not timely available and the RRC connection context is expired.

12. The method of claim 11, wherein the RRC Resume directive indicates that the radio network device should perform the RRC Resume procedure, and further includes information relevant to the RRC Resume procedure.

13. The method of claim 12, wherein the information relevant to the RRC Resume procedure comprises information on whether or not a previously established Robust Header Compression context can be re-used in the RRC Resume procedure.

14. A radio network device operative in a wireless communication network, the radio network device comprising:
   an antenna;
   a transceiver operatively connected to the antenna; and
   processing circuitry operatively connected to the transceiver, and operative to:
   receive, from a radio network node, one of a paging message and a Random Access Response (RAR) message, the paging or the RAR message including a Radio Resource Control (RRC) Resume directive comprising at least an indication whether or not the radio network device should perform an RRC Resume procedure;
   when the RRC Resume directive indicates that the radio network device should perform the RRC Resume procedure, send an RRC Resume Connection Request message, including a Resume ID, to the radio network node to resume a prior RRC connection;
   when the RRC Resume directive indicates that the radio network device should not perform the RRC Resume procedure, send an RRC Connection Request message to the radio network node to establish a new RRC connection, and
   wherein the RRC Resume directive indicates that the radio network devices should not perform the RRC Resume procedure based on at least one of: the RRC connection context has been deleted, the RRC connection is not timely available and the RRC connection context is expired.

15. The radio network device of claim 14, wherein the RRC Resume directive indicates that the radio network device should perform the RRC Resume procedure, and further includes information relevant to the RRC Resume procedure.

16. The radio network device of claim 15, wherein the information relevant to the RRC Resume procedure comprises information on whether or not a previously established Robust Header Compression context can be re-used in the RRC Resume procedure.

17. The radio network device of claim 14, wherein the radio network device is a Machine Type Communication device.

18. The radio network device of claim 14, wherein the radio network device is a User Equipment.

* * * * *